(12) United States Patent
Moustakas et al.

(10) Patent No.: US 6,782,257 B1
(45) Date of Patent: Aug. 24, 2004

(54) METHOD FOR MODELING AN INFORMATION CAPACITY OF A MULTIANTENNA WIRELESS SYSTEM

(75) Inventors: Aris Leonidas Moustakas, New York City, NY (US); Steven Herbert Simon, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 53 days.

(21) Appl. No.: 10/246,843

(22) Filed: Sep. 18, 2002

(51) Int. Cl.[7] .................................................. H04Q 7/20

(52) U.S. Cl. ................. 455/423; 455/67.14; 455/67.16; 455/446; 455/506; 702/150

(58) Field of Search ........................ 455/39, 63.1, 63.2, 455/65, 67.11, 67.12, 67.13, 67.14, 67.16, 423, 446, 504, 506, 507, 522, 524, 525; 324/644, 646; 702/150, 156–158, 159

(56) References Cited

U.S. PATENT DOCUMENTS

| | | | | |
|---|---|---|---|---|
| 4,931,977 A | * | 6/1990 | Klemes | 702/195 |
| 5,450,615 A | * | 9/1995 | Fortune et al. | 455/67.16 |
| 6,119,009 A | * | 9/2000 | Baranger et al. | 455/446 |
| 6,175,811 B1 | * | 1/2001 | Tekinay | 702/71 |
| 6,414,634 B1 | * | 7/2002 | Tekinay | 342/453 |
| 6,519,465 B2 | * | 2/2003 | Stilp et al. | 455/456.1 |
| 6,614,859 B2 | * | 9/2003 | Lay | 375/341 |
| 6,678,525 B1 | * | 1/2004 | Baranger et al. | 455/446 |

* cited by examiner

*Primary Examiner*—Binh Tieu

(57) ABSTRACT

Methods of designing, installing and operating communications systems including multiple input multiple output (MIMO) antenna arrays are disclosed. The methods account for the diffusive nature, the polarization nature, and the multi-path nature of the environment in which the antenna arrays operate. According to the various methods, the antennas can be designed, installed and operated so as to provide improved information capacity based on the diffusive, polarization and multi-path nature of the environment in which they operate.

20 Claims, 4 Drawing Sheets

METHOD FOR MODELING AN INFORMATION CAPACITY OF A MULTIANTENNA WIRELESS SYSTEM

FIELD OF THE INVENTION

The present invention relates to multi-antenna wireless systems in general, and, more particularly, to techniques for modeling capacity of propagation and reception of multi-antenna wireless signals in multi-path environments.

BACKGROUND OF THE INVENTION

Designing workable antennas and antenna arrays, although a non-trivial task, is not sufficient to optimize the performance of information transfer between a transmitter and a receiver. The antenna arrays need to be optimized in design, location, and operation, taking into account the surrounding environment. Objects in the environment in which an antenna array operates often reflect and diffuse a transmitted signal along the way to a receiving antenna, thereby influencing its efficiency.

FIG. 1 depicts an illustrative terrestrial environment that comprises: transmitting antenna 101, receiving antenna 102, forest 111, building 112, building 113 and boat 114. As a signal is transmitted from transmitting antenna 101 to receiving antenna 102, the signal is likely to be scattered by objects in the environment that are near and between the transmitting antenna and the receiving antenna. A good antenna design considers the scattering of the transmitted signal.

In the prior art, the multi-path character of the environment has not, in general, been considered in designing antennas. Rather, designers have usually made the simplifying assumption that the antennas operate in "free space." This meant that to design a good antenna array one had to place antennas in the array so that they can transmit to or receive from one particular direction, the so-called line of sight to the receiving/transmitting array. FIG. 2 depicts transmitting antenna 201 and receiving antenna 202 in free space. When antennas are operating in free space, it is assumed that the transmitted signal radiates without scattering from the transmitting antenna to the receiving antenna. This assumption is perhaps reasonable for rural environments, but is untenable for many urban and outdoors applications (e.g., cities, large structures, buildings, office spaces etc.). The result is that antenna arrays designed and fabricated to operate in free space provide poor performance when operating in multi-path, diffusive environments. Therefore, the need exists for a technique that accounts for the multi-path character of the environment in which the antennas are to operate.

Also, the prior art does not address the need for optimizing transmitter configurations within diffusive and reflecting environments, such as a building, when both power and diversity are factors in such an environment. This results in prior art systems that are designed to transmit more power than necessary for a given configuration and systems that could have larger information capacity if changes were made to the locations and number of antennas in the environment. The prior art does not address the information capacity of a system independent from the power of the signal. Therefore, a need exists for a technique that accounts for transmitted power and diversity of the transmitted and received signals in order to achieve a desired information capacity, especially in systems with multiple-input-multiple-output (MIMO) configurations.

SUMMARY OF THE INVENTION

The present invention makes advantageous use of the statistical properties of a function, $S(r, k, \epsilon; r', k', \epsilon')$ of the propagation and reception of wireless signals in order to provide a method for modeling an information capacity of a multi-antenna wireless system, especially in a diffusive environment where previous methods result in systems that have lower information capacities, or higher power use for equivalent information capacities.

Some embodiments of the present invention provide an ability to design, install and operate antennas without some costs and disadvantages of techniques in the prior art. In particular, the illustrative embodiment of the present invention not only considers the multi-path character of the environment in which the antennas will operate, but also takes advantage of the multi-path character of signals caused by reflection and scattering. Furthermore, the illustrative embodiment of the present invention can provide the design which when installed and operated provides optimal channel information capacity by taking advantage of the multi-path character of the environment in which the antennas operate.

The illustrative embodiment of the present invention models the multi-path character of the environment using a diffusive or statistical model and uses an iterative approach to predict the performance of candidate antenna designs in that environment and to suggest improvements in the design until the predicted performance reaches an optimal or otherwise acceptable level.

In another aspect, the invention provides a method for configuring a wireless communication system that has a plurality of antennas. The method includes solving one of a diffusion equation, a Boltzmann equation, and a ray tracing equation to evaluate an average of some function of a two-point complex amplitude transmission matrix representative of the communication system; and calculating a set of quantities from the evaluated complex amplitude transmission matrix, each of the quantities representative of the performance of a communication link or communication system.

In other embodiments, methods described herein are performed on computers or application specific processors. In these embodiments, a program storage medium encodes a computer executable program of instructions for performing the various steps of one of the above methods. Exemplary computer storage media for such programs include: magnetic tapes, magnetic disks, compact optical disks, hard drives, read-only-memories, and active memory devices.

DETAILED DESCRIPTION

Figure 1:
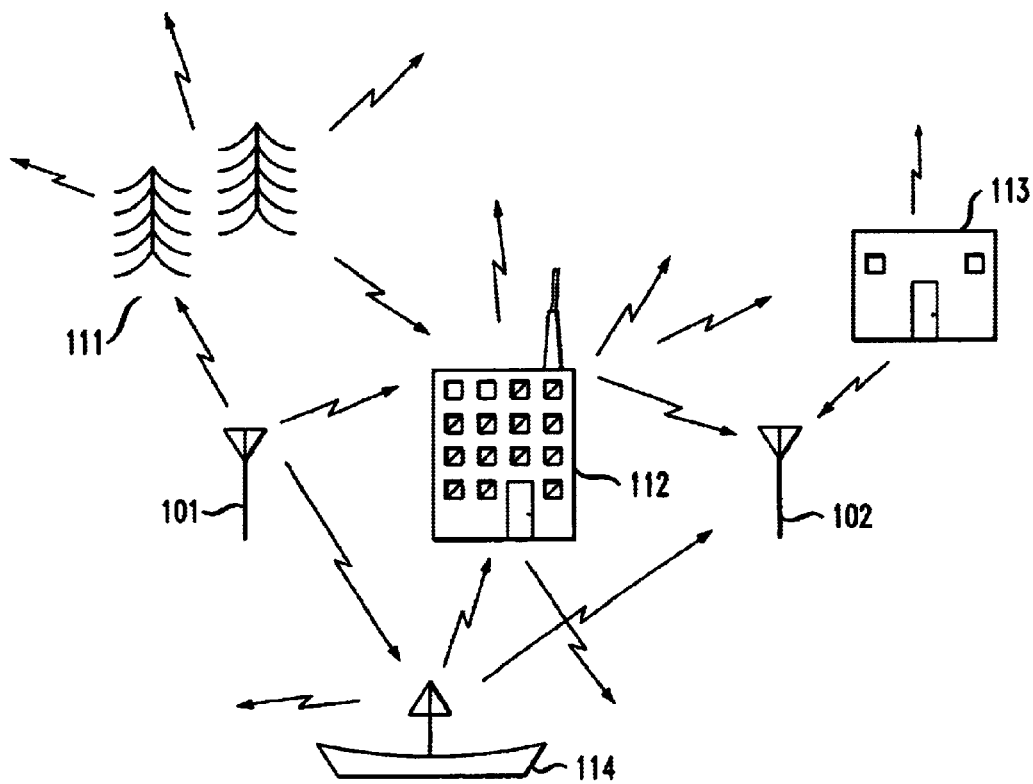
FIG. 1 depicts an illustration of two antennas in a multi-path environment.
Figure 2:
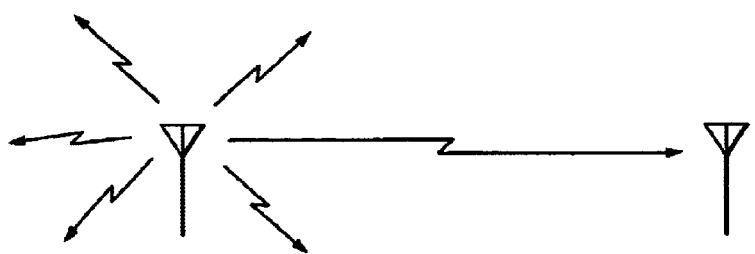
FIG. 2 depicts an illustration of two antennas in a free space.

The present invention makes advantageous use of a function, $S(r, k, \epsilon; r', k', \epsilon')$ of the propagation and reception of wireless signals in order to provide a method for modeling a capacity of a multi-antenna wireless system, especially in a diffusive environment where previous methods result in systems that have lower data capacities, or higher power use for equivalent capacities. The function $S(r, k, \epsilon; r', k', \epsilon')$ is commonly referred to as a transfer function by electrical engineers, or as a Greens function by mathematical physicists. We will call $S(r, k, \epsilon; r', k', \epsilon')$ the "two-point complex amplitude transmission matrix" (occasionally we will drop the word "complex" for brevity). Obtaining the complete form of the function $S(r, k, \epsilon; r', k', \epsilon')$ can be time consuming and computationally difficult, as demonstrated by U.S. Pat. No. 5,450,615 by S. Fortune et al. entitled Prediction of Indoor Electromagnetic Wave Propagation for Wireless Indoor Systems. For that reason, the present embodiments take a practical approach for partly calculating the function $S(r, k, \epsilon; r', k', \epsilon')$, i.e., $S(r, k, \epsilon; r', k', \epsilon')$ is calculated sufficiently to enable optimization of the information capacity. In particular certain averages of functions of $S(r, k, \epsilon; r', k', \epsilon')$ are calculated.

Herein, various methods for solving for the properties of a two-point complex amplitude transmission matrix of a communication system involve solving an environmentally averaged transport equation. Exemplary methods involve solving: a Boltzmann diffusion model, a statistical Boltzmann model, or a diffusion equation model for a representation of the system's environment. Other exemplary methods involve solving ray tracing equations for a model of the system's environment and then, averaging sets of ray tracing solutions between two points over phases of the solutions. Several of these exemplary methods are discussed in Baranger et al, U.S. Pat. No. 6,119,009 "Method and apparatus for modeling the propagation of wireless signals in buildings" which is hereby incorporated by reference.

Generally, in the present patent application we provide an optimized deployment of antennas when partial information is known about the function $S(r, k, \epsilon; r', k', \epsilon')$, the two point complex amplitude transmission matrix. $S(r, k, \epsilon; r', k', \epsilon')$ is a mathematical expression of the amplitude and phase of a plane-wave received by a receiver in direction k' with polarization $\epsilon'$ at position r' from the transmitter at position r that transmits a wave in direction k with polarization $\epsilon$. The magnitude of k is taken to be the same as the magnitude of k'. Note also, that in order to define a phase of the wave, one must pick a reference time $t_0$ and a spatial position $X_T$ to be the precise position of the transmitter array and $X_R$ to be the precise position of the receiver array. The definition of this time and these points are arbitrary, that is one could chose any particular point on the array and call that particular point X, but it is convenient to make this choice for bookkeeping purposes. The information about the transmitting and receiving arrays is summarized in the so-called response functions of these arrays.

We define $\chi_R^\alpha(k, \epsilon)$ to be the response function of the receiver antenna element, also known as the complex gain of the receiver antenna element. Here, $\alpha=1 \ldots n_R$ indexes the particular receiving antenna element in the receiving array (with $n_R$ the total number of receiving antenna elements in the receiving array). We define $\chi_R^\alpha(k, \epsilon)$ as follows: If a wave fixed to have unit amplitude and zero phase at arbitrary time $t_0$ and at position $X_R$ is incident upon the receiving array from direction k with polarization $\epsilon$, then the response of antenna $\alpha$ (i.e., the current amplitude and phase out of the $\alpha$ port of the antenna) is given by $\chi_R^\alpha(k, \epsilon)$. Similarly, to those skilled in the art, it is obvious how to define the response function, or complex gain, $\chi_T^j(k, \epsilon)$ for the transmitter for $j=1 \ldots n_T$ with $n_T$ the number of transmit antennas in the transmit array. If a current of unit amplitude and zero phase at $t_0$ is input into antenna j of the antenna array, then the magnitude and phase of the outgoing wave in direction k is given by $\chi_T^j(k, \epsilon)$ (again here the phase is referenced to the point $X_T$ and time $t_0$). As a simple example of $\chi_R^\alpha(k, \alpha)$, imagine a case where (a) all of the antennas [in both transmitter and receiver] lie in a plane, (b) all antennas are identical simple dipole antennas with polarization perpendicular to this plane, and (c) there is no mixing of polarizations upon scattering. In this case, S is not a function of the polarization $\epsilon$ (we then think of this as scalar electromagnetism). Further, we might assume that all of the antennas are non-interacting dipoles. In this case, the response functions $\chi_R^\alpha(k)$ [note that $\epsilon$ is not in the problem any more] are given by $$\chi_R^\alpha(k) = c \exp(ik \cdot [r_\alpha - X_R]) \tag{1}$$

where $r_\alpha$ is the position of antenna element $\alpha$ in the receiving array and c is a constant. This simple case is also known as "ideal noninteracting monopole antennas with scalar waves." which we shall use as an example below.

With the above definitions, the channel matrix between the transmitter and the receiver is given generally by $$G_{j\alpha} = \int dk \int dk' \chi_T^j(k,\epsilon) S(r,k,\epsilon; r',k',\epsilon') \chi_R^\alpha(k',\epsilon') \tag{2}$$

Note that the arbitrary choices in the definitions of S and $\chi$ now cancel. I.e., if we change the arbitrary definition of the point $X_R$ from one point to another, then both S and $\chi_R$ will change their phases, but in such a way such that G does not change. To those skilled in the art, it is well known that there are many equivalent ways of representing the functions $S(r, k, \epsilon; r', ', \epsilon')$, $\chi_R^\alpha(k, \epsilon)$, and $\chi_T^\alpha(k, \epsilon)$ which contain the same information (such as in terms of angular momentum components, or spherical harmonics). It will be clear to those skilled in the art that other choices of representations of these quantities may be used without departing from the present invention.

In terms of the channel matrix G, the signal input-output relations are $$r_\alpha = \sum_{j=1}^{n_T} G_{j\alpha} t_j + h_\alpha \tag{3}$$

Here $t_j$ is the signal transmitted from antenna j, $r_\alpha$ is the signal received at antenna $\alpha$ and $\eta_\alpha$ is the noise received at antenna $\alpha$.

The mutual information of the channel (in bits per second per hertz) is given by $$I = \log_2 \det(1 + G^+ Q G/N) \tag{4}$$

where N is the noise power and 1 is an $n_R$ dimensional unit matrix. Here Q is the covariance matrix of the transmitted signals $t_j$. We define $Q_{ij} = <t_i^* t_j>$ where the angular brackets indicate a time average at the frequency of interest and the star denotes complex conjugation. The trace of the matrix Q is the total power transmitted at the frequency of interest. Frequently, we may want to consider the case where Q is a unit matrix (as Bell Laboratories Layered Space Time (BLAST), in particular, operates in this mode) as described in U.S. Pat. No. 6,097,771, issued Aug. 1, 2000, by Foschini et al. entitled Wireless Communications System Having a Layered Space-Time Architecture Employing Multi-element Antennas, herein incorporated by reference in its entirety. However, we may also consider the possibility of optimizing over Q. Indeed, one can frequently increase the information capacity by doing such an optimization. If G were completely and precisely known, this would be the end of the story. One, would calculate I and try to change either Q or the design/position/orientation/etc of the transmitting or receiving arrays (which would change G) so as to maximize throughput. However, one advantageous point of the present embodiments is that they also consider cases where G is not completely and precisely known.

Those skilled in the art will realize that other expressions can be used in place of Eq. (4) to represent the information capacity of a system when minor modifications are made to the situation. For example, if the noise at different receivers is correlated, the scalar noise quantity N must be replaced by a noise matrix.

Embodiment 1

In the first embodiment of the present invention that we discuss here, we assume that there are only a few (1, 2, 3, . . .) different paths that the waves can take to get from the transmitter to the receiver. (The meaning of the word "few" here can be extended to go up to hundreds of paths or more, depending on the amount of calculational power at hand). In this embodiment we will use phase averaged ray tracing as a technique to calculate the average of a function of the two point complex amplitude transmission matrix S.

Generically we can the decompose $S(r, k, \epsilon; r', k', \epsilon')$ into the contributions of the different paths from the transmitter to the receiver $p=1 \ldots n_p$, (indicating $n_p$ different paths).

$$S(r, k, \epsilon; r', k', \epsilon') = \sum_{p=1}^{n_p} A_p e^{i\phi_p} \delta(k - k_p) \delta(k' - k'_p) \delta(\epsilon - \epsilon_p) \delta(\epsilon' - \epsilon'_p) \quad (5)$$

where the sum is over discrete paths and $\delta$ is a Dirac delta function (defined so that $\int dk \delta(k)=1$). Here, $k_p$ is the outgoing direction of path p from the transmitter and $k_p'$ is the ingoing direction of that path into the receiver. Here, $A_p$ is a real number indicating the attenuation of the wave along path p and $\phi_p$ indicates the phase accumulated by the wave along the path. For example, if the path is simple line of sight propagation for a distance d we have $A=1/d$ and $\phi=kd=2\pi d/\lambda$. The calculation of the amplitudes $A_p$ and the phases $\phi_p$ is what is known as raytracing, as discussed by U.S. Pat. No. 5,450,615 by S. Fortune et al., entitled Prediction of Indoor Electromagnetic Wave Propagation for Wireless Indoor Systems. However typical ray tracing routines are inaccurate at predicting the phase $\phi_p$. It is easy to see that this should be the case, since typically the distance between the transmitter and receiver is large, so A changes only very weakly as we change the position of the transmitter or receiver or scatterers in the environment, whereas $e^{i\phi}$ changes very strongly if the positions are changed by even a fraction of a wavelength, or if the transmission frequency is changed only a tiny amount (even in a reasonably narrow band transmission system this may become important).

Thus, in this particular embodiment we look at a case where all of the $A_p$'s are known (at least to a very good approximation, perhaps from a ray tracing calculation), but the $\phi_p$'s are unknown (or not well known). We will then average quantities over the $\phi_p$'s. This "phase averaged" ray tracing allows us to make predictions using only this partial information about $S(r, k, \epsilon; r', k', \epsilon')$.

We believe this case where only partial information about S is known is realistic. Certain statistical information about S is known although S itself is not completely known (thus, by Eq. 2 statistical information about G is known although G itself is not known.). More specifically, we consider the case where the "ensemble" of possible instantiations is defined by completely random choices of the $\phi_p$'s. Thus, if we have any function of the $\phi$'s we can define its phase average over the ensemble to be $$\bar{f} = \int \frac{d\phi_1}{2\pi} \int \frac{d\phi_2}{2\pi} \ldots \int \frac{d\phi_{n_p}}{2\pi} f[\phi_1, \phi_2, \phi_3, \ldots, \phi_{n_p}] \quad (6)$$

where the overbar of f indicates an average over the ensemble of $\phi$'s (i.e., as represented by the integrals).

One quantity we might consider looking at is the average mutual information. Note that since the information in Eq. 4 is defined in terms of G, and G is defined in terms of S (via Eq. 2) we thus have I being a function of S. Furthermore with S in turn dependent on the $\phi_p$'s, I is dependent on the $\phi_p$'s. We then write the phase averaged information as $$\bar{I} = \int \frac{d\phi_1}{2\pi} \int \frac{d\phi_2}{2\pi} \ldots \int \frac{d\phi_{n_p}}{2\pi} I[\phi_1, \phi_2, \phi_3, \ldots, \phi_{n_p}] \quad (7)$$

Averages can be taken either analytically or numerically. Note again that the quantity $\bar{I}$, the expected information capacity, is obtained by averaging of a function of S.

One might imagine trying to maximize this quantity by varying the matrix Q (the transmission covariance matrix), or by varying the details of the antenna arrays (thus changing $\chi_T$ or $\chi_R$). One could also imagine, in deploying a system, that one would want to change the positions of the base station antenna arrays (thus changing the paths) in order to obtain an acceptable coverage, etc.

More generally, we note that one might want to consider other measures of the capacity than simply the expected capacity. For example, one may want to look at the entire distribution of I's that occur in the ensemble. Another particularly useful measure of capacity is the cumulative distribution function which can be written as $$CDF(I_0) = \overline{\theta(I_0 - I)} \quad (8)$$

where $\theta$ is the step function ($\theta(x)=1$ if $x>0$ and is zero otherwise). We note that $CDF(I_0)$ is the fraction of the time that the realized mutual information is less than $I_0$. Frequently in system design, one defines the so-called outage function which is the inverse function of CDF.

$$x = CDF(I) \leftrightarrow I = \text{Out}(x) \quad (9)$$

As its name suggests, the x outage is the minimum capacity which occurs in all but a fraction x of the instantiations of the channel. One may choose a particular x outage and attempt to maximize Out(x) again by varying system parameters like antenna design, placement, etc. (Again we remind the reader that since I is a function of S, we are evaluating an average of a function of S).

EXAMPLES

We now turn to some examples related to this embodiment. Here we will illustrate our invention with those examples that are mostly solvable analytically (more cases may be handled with some amount of numerics).

Example 1

As a very simple example, we consider the case of a single transmitter in the transmitting array and 2 receiving antennas in the receiving array where there are only 2 paths from the transmitter to the receiver. We thus have $$G_{1\alpha}=A_1e^{i\phi_1}\chi_T(k_1,\epsilon_1)\chi_R^\alpha(k'_1,\epsilon'_1)+A_2e^{i\phi_2}\chi_T(k_2,\epsilon_2)\chi_R^\alpha(k'_2,\epsilon'_2) \quad (10)$$

with $\alpha=1,2$. Such a representation would be obtained from the result of a simple ray-tracing calculation. We rewrite this in the convenient form $$G_{1\alpha}=\sqrt{N}[B_\alpha e^{i\phi_1}+C_\alpha e^{i\phi_2}] \quad (11)$$

where $$B_\alpha=A_1\chi_T(k_1,\epsilon_1)\chi_R^\alpha(k'_1,\epsilon'_1) \quad (12)$$

$$C_\alpha=A_2\omega_T(k_2,\epsilon_2)\chi_R^\alpha(k'_2,\epsilon'_2) \quad (13)$$

Again, if the precise position of the transmitter and receiver are not quite known (or vary a bit), or if the frequency may vary a bit, then the $\phi$'s are uncertain and must be averaged over. This turns our ray tracing result into "phase averaged" ray tracing.

The mutual information is given by $$I=\log_2 \det(1+G^+G/N)$$
$$=\log_2[E+Fe^{i(\phi_1-\phi_2)}+F^*e^{-i(\phi_1-\phi_2)}] \quad (14),(15)$$

where $$E=1+|B_1|^2+|B_2|^2+|C_1|^2+|C_2|^2 \quad (16)$$

$$F=B_1C_1^*+B_2C_2^* \quad (17)$$

The average over all $\phi$'s is then given by $$\bar{I}=\int \frac{d\phi_1}{2\pi}\int \frac{d\phi_2}{2\pi}I[\phi_1,\phi_2] \quad (18)$$

$$=\int \frac{d\phi}{2\pi}\log_2(E+2|F|\cos\phi) \quad (19)$$

$$=\frac{1}{\ln 2}\ln\left[\frac{E+\sqrt{E^2-4|F|^2}}{2}\right] \quad (20)$$

where the integral in equation (19) has been performed analytically with a standard integral table.

Now with respect to optimization, let us consider, for example, the relative positions of the two receiving antennas. We assume non-interacting antennas, so $\chi_R^\alpha$ is a function of the position of antenna $\alpha$ only (not the relative position of the two antennas). We then see that moving around the relative positions of the receiving antennas changes only the phases of $\chi_R^\alpha(k,\epsilon)$ (see the above example of noninteracting monopole antennas). If we assume that the two receiving antenna elements are identical then we obtain $$F\sim \chi_R^1(k'_1,\epsilon'_1)[\chi_R^2(k'_2,\epsilon'_2)]^*+\chi_R^2(k'_1,\epsilon'_1)[\chi_R^2(k'_2,\epsilon'_2)]^* \quad (21)$$

$$\sim e^{i(k'_1-k'_2)\cdot r_1}+e^{i(k'_1-k'_2)\cdot r_2} \quad (22)$$

To optimize the capacity in Eq. 20 we would like to minimize the magnitude of F. Thus we calculate $$|F|^2 \sim 2+2\cos[(k'_1-k'_2)\cdot(r_1-r_2)] \quad (23)$$

Expression (23) can be minimized by choosing a vector between position $r_1$ and $r_2$ to satisfy $$(k'_1-k'_2)\cdot(r_1-r_2)=(2n+1)\pi \quad (24)$$

which then optimizes the capacity. Equation 24 provides a way to minimize equation 23 and obtain an optimal relative location between receiver antenna elements 1 and 2 of the receiving antenna. As mentioned above, the technique discussed in this example is a very simple version of ray tracing. The novel addition here is the use of random phases which are averaged over such that the ray tracing does not obtain the Green's function $S(r,k,\epsilon;r',k',\epsilon')$ per-se but only statistical information about this quantity.

Example 2

Let us now consider the slightly more complicated reciprocal case of two transmitting antennas and a single receiver with again, only two paths from the transmitter to the receiver. If we insist that the two transmitters send independent signals (Q=1) then, the problem is simply analogous to Example 1 above. However, more generally, we might consider an arbitrary transmit signal covariance (Q) in which case the mutual information is $$I=\log_2\det(1+G^+QG/N) \quad (25)$$

$$I=\log_2(1+[|G_{11}|^2q_{11}+|G_{21}|^2q_{22}+G_{11}^*G_{21}q_{12}+G_{21}^*G_{11}q_{21}]/N) \quad (26)$$

where $$Q=\begin{pmatrix}q_{11}q_{12}\\q_{21}q_{22}\end{pmatrix} \quad (27)$$

is a hermitian matrix. Constraining the total transmitted power to be fixed is equivalent to constraining $q_{11}+q_{22}$ to be fixed (usually normalized to $q_{11}+q_{22}=$total power transmitted).

Here we have $$G_{j1}=A_1e^{i\phi_1}\chi_T^j(k_1,\epsilon_1)\chi_R(k'_1,\epsilon'_1)+A_2e^{i\phi_2}\chi_T^j(k_2,\epsilon_2)\chi_R(k'_2,\epsilon'_2) \quad (28)$$

with j=1,2. We rewrite this in the convenient form $$G_{j1}=\sqrt{N}[B_je^{i\phi_1}+C_je^{i\phi_2}] \quad (29)$$

where $$B_j=A_1\chi_T^j(k_1,\epsilon_1)\chi_R(k'_1,\epsilon'_1) \quad (30)$$

$$C_j A_2\chi_T^j(k_2,\epsilon_2)\chi_R(k'_2,\epsilon'_2) \quad (31)$$

We again obtain $$I=\log_2[E+Fe^{i(\phi_1-\phi_2)}+F^*e^{-i(\phi_1-\phi_2)}] \quad (32)$$

where now $$E=1+(|B_1|^2+|C_1|^2)q_{11}+(|B_2|^2+|C_2|^2)q_{22}+(B_1^*B_2+C_1^*C_2)q_{12}+(B_2^*B_1+C_2^*C_1)q_{21} \quad (33)$$

$$F=B_1C_1^*q_{11}+B_2C_2^*q_{22}+B_1C_{23}^*q_{12}+B_2C_1^*q_{21} \quad (34)$$

The average over all $\phi$'s is again $$\bar{I}=\frac{1}{\ln 2}\ln\left[\frac{E+\sqrt{E^2-4|F|^2}}{2}\right] \quad (35)$$

With this result, one maximize the expected capacity $\bar{I}$, over all possible transmission covariance matrices Q subject to some power constraint.

Example 3

A natural generalization of the above example is to the case or model of m transmitters, again where there are only two paths from the transmitters to the receiver. We again have $$I=\log_2\det(1+G^+QG/N) \quad (36)$$

with Q a hermitian m by m matrix normalized so Trace[Q]= total power transmitted. Eqs. 28 through 32 still hold, only now j takes values from 1 to m so that we now have (with B can C being vectors of length m here)

$$E=1+B^+QB+C^+QC \quad (37)$$

$$F=B^+QC \quad (38)$$

The average over $\phi$'s is again given by Eq. 35 only with these new values of E and F.

Again we can consider maximizing expression (39) over either Q or over the antenna array design or orientation etc.

Embodiment 2

In this embodiment we will use diffusive modeling to calculate the average of a function of the two point complex amplitude transmission matrix. In this embodiment of the invention we also describe an example of how to model and optimize the deployment of transmitting antennas (for example: base-station(s)) in a diffusive building when partial information is known about the function $S(r, k, \epsilon; r', k', \epsilon')$. Also recall from equation 2 that the total complex amplitude received from receiving antenna at which is transmitted from antenna i is given in this notation by $$G_{j\alpha} = \int dk \int dk' \chi_T{}^j(k,\epsilon) S(r,k,\epsilon;\ r',k',\epsilon') \chi_R{}^\alpha(k',\epsilon') \quad (2a)$$

where $\chi_R{}^\alpha(k, \epsilon)$ to be the response function of the receiver and $\alpha=1 \ldots n_R$ is the receive antenna index, and with similar notation for the transmitter with index $i=1 \ldots n_T$. $G_{i\alpha}$ forms a complex matrix when multiple antennas are placed in an array at both transmitter and receiver. This matrix can then be used to calculate the maximum throughput given by $$I(r_0,r)=\log_2\det(1+G^+QG/N) \quad (39)$$

similar to Eq. 4 where $r_0$ is the transmitter position and r is the receiver position. Given $I(r_0,r)$ we can optimize the position of the transmit array to maximize e.g. the average total throughput ($\int dr I(r_0, r)$). For indoor propagation and transmit and receive antennas $n_T, n_R >= 2-3$ the information throughput can be approximated by its average $I(r_0, r)$. The average is over all realizations of scattering (i.e. locations of walls, chairs etc), which the waves can encounter in their path from transmitter to receiver. Therefore the averaging, although getting rid of all specifics of the propagation environment retains the essentials, i.e. the typical distances between walls, the fact that most scatterers are in right angles with each other etc. This averaging is advantageous because the exact details of the propagation are extremely difficult to calculate and/or measure at every point in a building. Also we can apply the same parameters and structure to various similar buildings that have the same statistical properties.

Next, we consider evaluating statistics of G (or S). In the diffusive case, which we consider in this example, it is sufficient to calculate $\overline{GG^+}$ since $\overline{G}=0$ and the higher moments are small if the distance between scatterers (approx. meters) is large compared to the wavelength (approx. 10 cm. Thus, the higher moments are small.). We point out that since G is related to S via Eq. 2a we are again calculating the average of a function of S.

Example 4

For this example, the following simplifying assumptions were made.

1. Scalar waves: Electromagnetic waves have two polarizations. We only treat scalar waves for simplicity (and thus drop the dependences on $\epsilon$).
2. Our antennas are assumed to be ideal isotropic monopole antennas.
3. 2-dimensional propagation: We assume that the waves propagate only within a floor of the building. Thus their propagation can be described by angles. To take into account the $3^{rd}$ dimension, loss length $l_{loss}$ is introduced, which is determined empirically.
4. All scattering is from walls that are at right angles to each other. This then implies that S(r, k; r', k') is nonzero only when k=k' or when k is a reflection of k' with respect to the axes of the walls.

Given these assumptions the quantity $\overline{GG^+}$ has elements given by $$K_{ij\alpha\beta} = \overline{G_{i\alpha}G_{m\beta}^+} = \int_0^{\pi/4} \frac{2d\theta}{\pi} R_{lm}(\theta, \theta_T) R_{\alpha\beta}(\theta, \theta_R) P(\theta; r_0, r) \quad (40)$$

where $$P(\theta;r_0,r)=\overline{|S(r_0,\theta;r,\theta)|^2} \quad (41)$$

and $\theta$ is here the direction of the vector k and k' up to reflections. Here, P is a statistical property of the Green's function S(r, k; r', k',)

Figure 3:
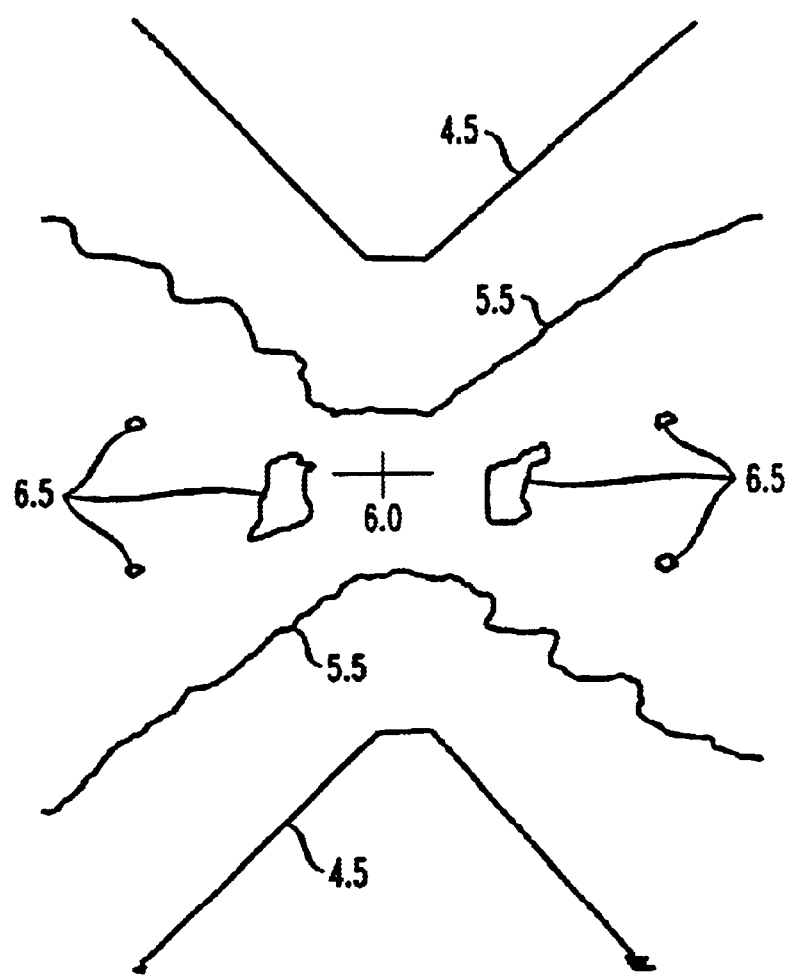
FIG. 3 depicts an illustration of the information capacity of a system of one transmitter driving a three element array and one receiver connected to a three element array.

In Eq. 40, $R_{\alpha\beta}$ $R_{lm}$ are the correlation matrices of the transmitting and receiving antenna pairs $\alpha,\beta$ and l,m and $\theta_T$, $\theta_R$ are the angles of the vertical vectors to the transmitting and receiving antenna arrays given by equation (42)

$$R_{lm}(\theta,\theta')=\cos(\pi(l-m)\sin\theta\cos\theta')\cos(\pi(l-m)\cos\theta\sin\theta') \quad (42)$$

where we have assumed a uniform linear array with nearest distance half a wavelength and P is the solution to the following diffusion equation (43):

$$D_x(\theta)\frac{\partial^2}{\partial x^2}P(\theta;r_0,r) + D_y(\theta)\frac{\partial^2}{\partial y^2}P(\theta;r_0,r) - \frac{P(\theta;r_0,r)}{l_{loss}} = \quad (43)$$

$$P_0\delta(r-r_0)$$

where $\theta$ is the angle of departure (up to reflections, i.e. $0<\theta<\pi/2$), $P_0$ is the input power at transmitter and $$D_x(\theta) = \cos^2\theta\left(\frac{2|\cos\theta|r(\theta)}{d_x} + \frac{1}{l_{loss}}\right)^{-1} \quad (44)$$

$$D_y(\theta) = \sin^2\theta\left(\frac{2|\sin\theta|r(\pi/2-\theta)}{d_y} + \frac{1}{l_{loss}}\right)^{-1} \quad (45)$$

are diffusion coefficients in the x and y-axes. In the above equations $d_x$ and $d_y$ are the typical distances between walls in the x and y directions and r is the reflection coefficient of the internal walls as a function of angle. Use of diffusion equations of this type is described in U.S. Pat. No. 6,119,009 (Baranger). As mentioned above, in addition to the diffusion equation, various other methods can be used to calulate the required averaged function of S (in this case we are concerned with P which is the averaged magnitude of S squared). Some exemplary methods have been discussed in U.S. Pat. No. 6,119,009 (Baranger) as well as in Ullmo, D., Baranger, H. U., IEEE Transactions on Vehicular Technology, Volume 48, May 1999, Page: 947–955, the In this illustrative example, we evaluated a solution for this diffusive differential equation for a building of size 100 m by 50 m, $d_x=d_y=5$ m and $l_{loss}=17$ m. The model reflection coefficient r was been taken as: $r(\theta)=A \sin(\theta)^2+B$, where A=0.2 and B=0.3. The resulting $P(\theta;r_0,r)$ was obtained from the diffusion equation which is appropriately discretized to obtain a numerical solution (10 angles uniformly spaced between 0 and 90 degrees were used). Using this, and including correlations functions R above describing the antennas for this embodiment, we then obtain the left hand side of Eq. 40 as a function of the transmitter and receiver positions. Using the methods described in U.S. patent application Ser. No. 09/378,362 filed Aug. 20, 1999 (Balents et al.), we evaluated the information capacity $I(r_0, r)$ of the channel for every r (receiver position) in the building given that $r_0$ (transmitter position) is at the center of the building. We have used a 3-element array for both transmitter(s) and receiver(s). The mutual information and power are plotted in FIGS. 3 and 4. FIG. 3 shows variations in information capacity as a function of position. Going outward from the center at a SNR=100 dB are regions of 6.0 bps/Hz, some 6.5 bps/Hz, 5.5 bps/Hz and below, then 4.5 bps/Hz and below.

Figure 4:
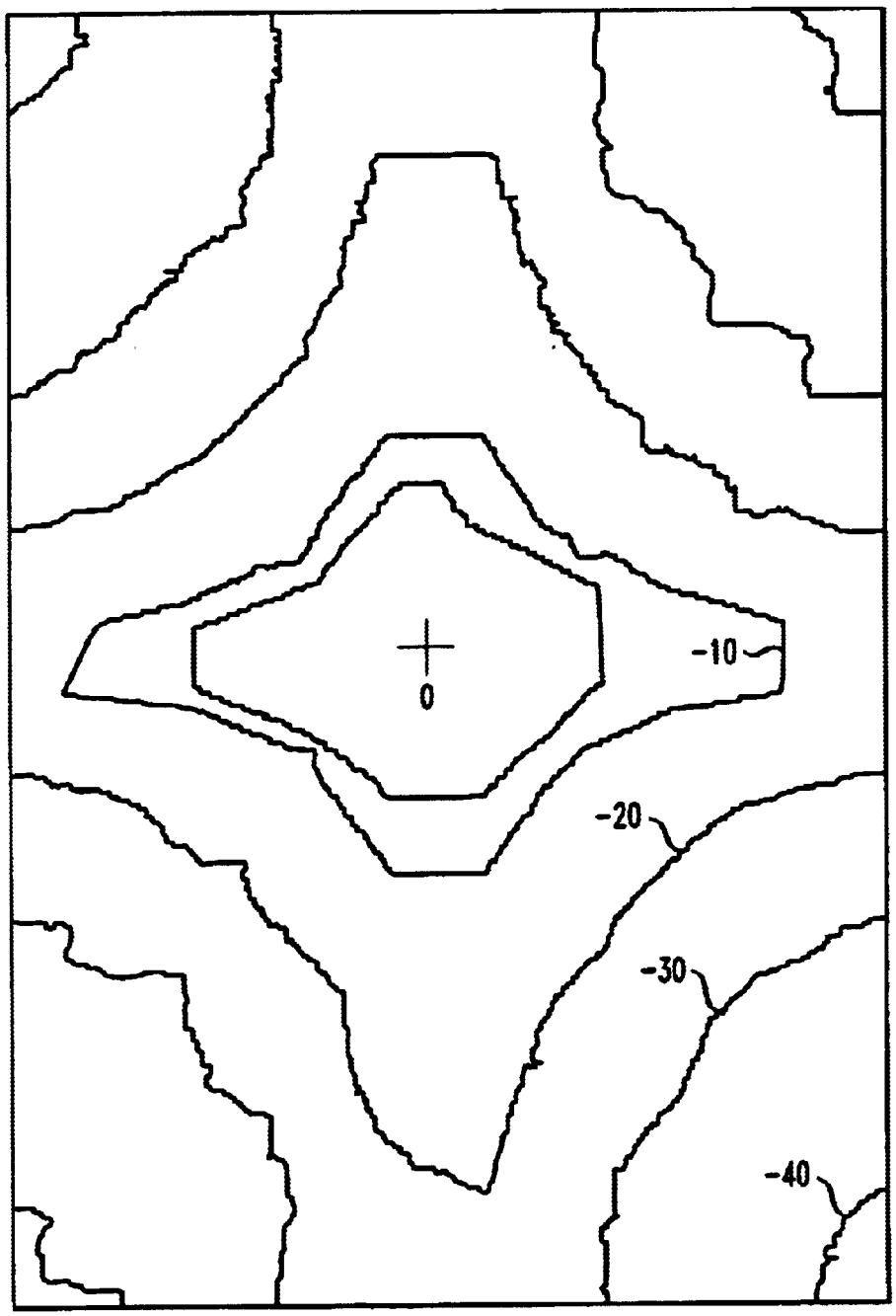
FIG. 4 depicts an illustration of the signal power distribution achieved by the transmitter driving the three element array.

In comparison, FIG. 4 shows the variations of the received power as a function of position. At the center, the power level is 0.0 dB, then reducing to −10 dB, −20 dB, −30 dB, and −40 dB as the distance from the origin increases. FIG. 4, a plot of simply the power arriving at any given point calculated with a diffusion equation, is prior art disclosed in in U.S. Pat. No. 6,119,009 (Baranger). We see, however, that the information capacity available to a multiantenna array (shown in FIG. 3) is quite different from simply the power. As we see from this comparision, in some situations, better information capacity occur where the power is relatively low. For example, the 'bow tie' pattern of FIG. 3 has some high information capacity locations along lines of approximately 45 degrees in all four quadrants even though the power along those 45 degree lines is comparatively low as seen in FIG. 4. The method of the present embodiment finds and uses such locations to provide higher information capacities at lower transmission power levels than the previous method of U.S. Pat. No. 6,119,009 (Baranger).

Example 5

We can easily generalize some of the results of Example 4. In the above example, we made four simplifying assumptions. (1) we considered scalar waves (2) we assumed trivial noninteracting monopole antennas (3) we assumed propagation was two dimensional and (4) we and assumed that all scattering off of walls was specular. These assumptions can be relaxed and we can still easily calculate the desired average of a function of the two point amplitude transmission matrix.

More generally, in diffusive cases, G is a random matrix with 0 average and its covariance K is defined as $K_{ij\alpha\beta}=\overline{G_{i\alpha}G^*_{j\beta}}$ where $G^*_{j\beta}$ is the complex conjugate of the matrix element $G_{j\beta}$ of G;

The overbar indicates an average over the multi-path environment, which includes random disorder;

K is a four-dimensional matrix of size $n_T$ by $n_T$ by $n_R$ by $n_R$, comprising of elements $K_{ij\alpha\beta}$;

for $\alpha=1$ to $n_R$ and $\beta=1$ to $n_R$; and for i=1 to $n_T$ and j=1 to $n_T$.

Although G has a zero average in the present example, it will be clear to those skilled in the art how to make and use embodiments of the present invention where G has a non-zero average. In this more general example, $$K_{ij\alpha\beta} = \int d\hat{k} \int d\hat{k}' T_{ij}(\hat{k}) \frac{P(\hat{k}, \hat{k}')}{n_T} R_{\alpha\beta}(\hat{k}') \qquad (46)$$

where:

$P(\hat{k},\hat{k}')$ is the power received at the receiving antenna from direction $\hat{k}'$ that is transmitted by the transmitting antenna in the direction $\hat{k}$, and the total power received is $P=\int d\hat{k}\int d\hat{k}'P(\hat{k},\hat{k}')$;

$T(\hat{k})$ is an $n_T$ by $n_T$ matrix, called the transmitter correlation matrix, in which the matrix element $T_{ij}(\hat{k})$ is the correlation of the signal transmitted from transmitting antenna element i in the direction $\hat{k}$ with respect to the signal transmitted from transmitting antenna element j in the same direction, and is defined as $$T_{ij}(\hat{k}) = \sum_{\hat{e}} w^T(\hat{k}, \hat{e}) \chi_i^T(\hat{k}, \hat{e}) \chi_j^{T*}(\hat{k}, \hat{e}) \qquad (47)$$

where:

$\chi_i^T(\hat{k},\hat{e})$ is the response of transmitting antenna element i to an outgoing plane wave with direction $\hat{k}$ and polarization $\hat{e}$;

$\chi_j^{T*}(\hat{k},\hat{e})$ is the complex conjugate of the response of transmitting antenna element j to an outgoing plane wave with direction $\hat{k}$ and polarization $\hat{e}$;

$w^T(\hat{k},\hat{e})$ is a weight function that gives the incident power leaving in direction $\hat{k}$ and polarization $\hat{e}$(where the overall scale of $w^T(\hat{k},\hat{e})$ is chosen so that the trace of matrix T equals $n_T$); and $$\sum_{\hat{e}}$$

is the normalized sum over all polarizations;

$R(\hat{k}')$ is an $n_R$ by $n_R$ matrix, called the receiver correlation matrix, in which the matrix element $R_{\alpha\beta}(\hat{k}')$ is the correlation of the signal received from receiving antenna element $\alpha$ from the direction $\hat{k}'$ with respect to the signal received from receiving antenna element $\beta$ from the same direction, and is defined as $$R_{\alpha\beta}(\hat{k}) = \sum_{\hat{e}} w^R(\hat{k}, \hat{e}) \chi_\alpha^R(\hat{k}, \hat{e}) \chi_\beta^{R*}(\hat{k}, \hat{e}) \qquad (48)$$

where:

$\chi_\alpha^R(\hat{k},\hat{e})$ is the response of receiving antenna element $\alpha$ to an incoming plane wave with direction $\hat{k}$ and polarization $\hat{e}$;

$\chi_\beta^{R*}(\hat{k},\hat{e})$ is the complex conjugate of the response of receiving antenna element $\beta$ to an incoming plane wave with direction $\hat{k}$ and polarization $\hat{e}$;

$w^R(\hat{k},\hat{e})$ is a weight function that gives the incident power arriving from direction $\hat{k}$ and polarization $\hat{e}$ (where the overall scale of $w^R(\hat{k},\hat{e})$ is chosen so that the trace of matrix R equals $n_R$); and $$\sum_{\hat{e}}$$

is the normalized sum over all polarizations;

∫ d$\hat{k}$ is the integral over all directions $\hat{k}$, normalized such that ∫ d$\hat{k}$=1; and ∫ d$\hat{k}'$ is the integral over all directions $\hat{k}'$, normalized such that ∫ d$\hat{k}'$=1.

For isotropically diffusive environments (and for simplified models which approach such environments), equation (46) becomes:

$$K_{ij\alpha\beta} = R_{\alpha\beta} \frac{P}{n_T} T_{ij} \quad (49)$$

where the matrix element $R_{\alpha\beta}$ is:

$$R_{\alpha\beta} = \int d\hat{k} R_{\alpha\beta}(\hat{k}) \quad (50)$$

where ∫ d$\hat{k}$ is the integral over all directions, normalized such that ∫ d$\hat{k}$=1.

The matrix element $T_{ij}$ is:

$$T_{ij} = \int d\hat{k} T_{ij}(\hat{k}) \quad (51)$$

where ∫ d$\hat{k}$ is the integral over all directions, normalized such that ∫ d$\hat{k}$=1.

For ease of computation, it may be convenient to use an alternate basis, such as spherical harmonics, in place of direction $\hat{k}$ and polarization $\hat{e}$. It will be clear to those skilled in the art that other choices of bases can be made without departing from the present invention.

Once K is determined, a performance measure of the system can be calculated from this quantity. For example, one may use the method disclosed in U.S. patent application Ser. No. 09/378,362 filed Aug. 20, 1999 (Balents et al.).

Generalized Technique

Figure 5:
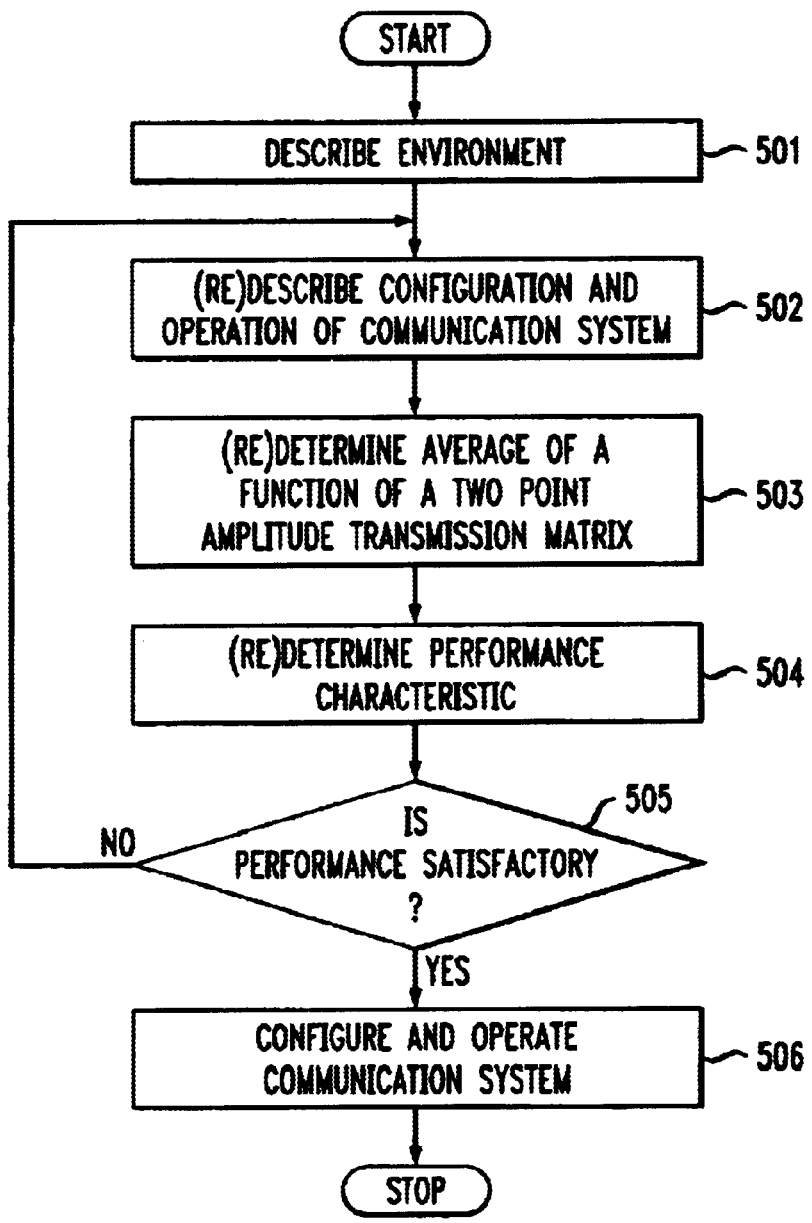
FIG. 5 depicts a flowchart of the illustrative embodiment of the present invention.

Referring now to FIG. 5, a flowchart for a method for modeling an information capacity of a multi-antenna wireless system is shown. This illustrative embodiment comprises four phases. In Phase 1 (step 501), the environment in which the communication system is to function is described. In Phase 2 (steps 502), the candidate communication system is described in terms of those parameters that if changed might affect the performance of the system. In Phase 3 (steps 503, 504, 505), the performance of the communication system is predicted with respect to the environment described in Phase 1 and the configuration and operation of the communication system described in Phase 2. If, after Phase 3, the predicted performance is unsatisfactory, the illustrative embodiment successively iterates through Phases 2 and 3, each time varying one or more parameters of the candidate communication system, until the performance of the candidate system is optimal or satisfactory. In Phase 4 (step 506), the system is configured and operated in accordance with the parameters that yielded the satisfactory performance prediction.

The illustrative embodiment predicts the performance of the communication system of interest, which by definition comprises just a single frequency defined in terms of its wavelength, λ (known as "narrow-band" communication). Communication systems designed in accordance with the present invention can easily transmit and receive more than one frequency at a time, but the illustrative embodiment only considers a signal of interest comprising one frequency at a time. It will be clear, however, to those skilled in the art how to make and use embodiments that consider a signal of interest comprising a plurality of frequencies.

Because the illustrative embodiment considers the nature of the environment surrounding the transmitters and receivers in designing the system, at step 501, those aspects of the environment that might affect the propagation of the signal of interest from the transmitting antenna to the receiving antenna are described. In particular, those aspects of the environment that might affect the propagation of the signal of interest are described in terms of their properties or geometry or both. Since multi-path, multi-direction signals are considered between a transmitting antenna and a receiving antenna, this describing includes the environment that causes the multiplicity of paths between each transmitting antenna and each receiving antenna.

A specific environment (for example, Bob's Warehouse at 42nd Street and 11th Avenue, Sherwood Forest, downtown St. Louis, etc.) might be described or a nonspecific environment (for example, a typical warehouse, a typical deciduous forest, a typical city, etc.) or a combination might be described. As disclosed in Baranger et al, U.S. Pat. No. 6,119,009 "Method and apparatus for modeling the propagation of wireless signals in buildings", some of the relevant properties of the environment may be advantageously measured and described by certain fit parameters.

The properties and geometric factors about the environment that might be described include:

Is the environment diffusive? In other words, is the mean free path of the environment much greater than the wavelength of the transmitted signal? Is all of the environment diffusive or only some portions?

If only some portions of the environment are diffusive, where are the antennas with respect to the diffusive portions? Are both the transmitting and receiving antennas deep within a diffusive portion (e.g., both within a building, one within a building and the other without, both within different buildings, etc.) or is one antenna inside a diffusive portion and the other outside the diffusive portion (e.g., the transmitting antenna is high on a tower where there is no clutter and the receiving antenna is on the ground floor of a building in Manhattan where there is lots of clutter, etc.).

Is the scattering of the transmitted signal isotropic? For example, the scattering within a building with walls at 90 degree angles is not isotropic because the scattering is not random.

Are there considerable or negligible signal losses due to absorption in the environment?

Are the signal losses due to absorption in the environment isotropic?

What are the propagation characteristics of polarization? Is it conserved? How well is it mixed?

The way that these environmental factors can be described in a useful (i.e., quantitative) form will be described below. It will be clear to those skilled in the art what other environmental properties and geometric factors that affect the propagation of the signal of interest might be considered.

In general, there is a trade-off between considering many properties and geometric factors and ignoring the properties and geometric factors. The consideration of many properties and geometric factors of the environment will tend to:

1. increase the performance of the resulting antennas;
2. increase the computational complexity of the process for designing the communication system; and
3. decrease the interval during which the parameters chosen in accordance with the illustrative embodiment are accurate (because the environment may change over time).

Therefore, it will be clear to those skilled in the art that, in general, the environment in which the antennas are to operate should probably not always be described in infinitesimal detail, but that certain simplifying assumptions should often be made. In many cases, the intentional and careful omission of some details will not affect the ability of the illustrative embodiment to design the antennas.

At step 502, the configuration and operation of the communication system is described in terms of the many factors that might affect the performance of the system.

Step 502 may advantageously include describing the properties and geometry of the transmitting and receiving antenna arrays, in terms of parameters that, if changed, might improve the performance of the resulting antennas.

The properties and geometric factors about the antenna elements that might be described include:

Are the antenna elements directional or omnidirectional?

What is the size of the antenna element as compared to the wavelength of the signal of interest?

What is the three-dimensional shape of the antenna element?

What is the polarization characteristic of the antenna?

Does the antenna element distort the near-field signal significantly?

How much does the antenna element feed influence the signal characteristics?

The way that the properties and geometric factors of the antenna elements factors can be described in a useful (i.e., quantitative) form will be described below. It will be clear to those skilled in the art what other properties and geometric factors that affect the propagation of the signal of interest might be considered.

As in step 501, there is a trade-off between considering many properties and geometric factors and ignoring the properties and geometric factors. The consideration of many properties and geometric factors of the antennas will tend to:

1. increase the performance of the resulting antennas;
2. increase the computational complexity of the process for designing the communication system; and
3. decrease the interval during which the parameters chosen in accordance with the illustrative embodiment are accurate (because the environment may change over time).

Therefore, it will be clear to those skilled in the art that, in general, the antenna elements should probably not always be described in infinitesimal detail, but that certain simplifying assumptions should often be made. In many cases, the intentional and careful omission of some details will not affect the ability of the illustrative embodiment to design the antennas.

At step 502, if either the transmitting antenna or the receiving antenna comprises a plurality of elements (i.e., is a compound antenna or an array), the compound nature of the antennas are described in terms of their properties or geometry or both. Furthermore, the position of the antennas with respect to the environment and with respect to each other is described. Advantageously, the properties and geometry of the compound nature of each antenna are described in terms of parameters that, if changed, might improve the performance of the resulting antennas.

The properties and geometric factors about the compound nature of the antennas that might be described include:

How many antenna elements are in the transmitting antenna? How many antenna elements are in the receiving antenna? For the purposes of this specification, the number of antenna elements in the transmitting antenna is represented by $n_T$, and the number of antenna elements in the receiving antenna is represented by $n_R$.

What is the geometry of the antenna elements in the transmitting antenna and in the receiving antenna? Are the antenna elements in a line? Or arranged in a two- or three-dimensional array?

Is the mutual coupling between the antenna elements to be considered or ignored?

What is the distance between the antenna elements in the transmitting antenna? What is the distance between the antenna elements in the receiving antenna? For the purposes of this specification, the distance between two antenna elements, antenna element a and antenna element b, in a single antenna is defined as $r_{ab}$.

How are the antenna arrays pointed with respect to the environment?

As in step 501, the consideration of many properties and geometric factors of the compound or array nature of the antennas will tend to:

1. increase the performance of the resulting antennas;
2. increase the computational complexity of the process for designing the communication system; and
3. decrease the interval during which the parameters chosen in accordance with the illustrative embodiment are accurate (due to temporal changes to environment).

Therefore, it will be clear to those skilled in the art that, in general, the compound nature of the antennas should not always be described in infinitesimal detail, but that certain simplifying assumptions should often be made. In many cases, the omission of some details, such as secondary moments and secondary effects, will not affect the ability of the method of the illustrative embodiment to design and optimize the antennas for first order effects.

Step 502 may also advantageously include describing the expected noise. What is the noise at each receiving antenna element? In the illustrative embodiment, the noise at each receiving antenna element is assumed to be Gaussian, independent of and identically distributed with respect to the noise at the other receiving antenna elements and its average power is assumed to be N. It will be clear to those skilled in the art how to make and use embodiments of the present invention in which the noise is not independent or identically distributed.

Step 502 should also include describing the method of signal transmission.

Is the transmitted power evenly or unevenly distributed among the various transmitting antenna elements? Is there correlation between the signals transmitted between the different antennas? For the purposes of this specification, the distribution of power among the $n_T$ transmitter elements for the signal of interest is described by the transmitter amplitude covariance matrix, Q, where the trace of Q equals $n_T$, the matrix element $Q_{ij}=<x_i(t)x^*_j(t)>$, $x_i(t)$ is the normalized instantaneous signal (electric field) transmitted by transmitter element i, for i=1 to $n_T$. $x^*_j(t)$ is the complex conjugate of the normalized instantaneous signal (electric field) transmitted by transmitter element j, for j=1 to $n_T$, and <X> is the time average of X at the frequency of interest. Note that the specification of the transmission covariance also implies specification of the total transmitted power P. In addition, describing the method of signal transmission may include describing a particular scheduling or transmission algorithm that will be used. Additional properties of the method of transmission that may be described will be known to those skilled in the art.

In addition to the examples given, the description of the communication system in step 502 may comprise describing other factors that may affect the performance of the system. It will be clear to those skilled in the art what other factors may be described in this step which may affect the performance of the system. At step 503, the process of predicting the performance of the communication system described in step 502 within the environment described in step 501 begins. In this step we must calculate an average of a function of a two point complex amplitude transmission matrix. This average will be used in step 504 to determine a performance characteristic. Note that the average of the function of the two point amplitude transmission matrix may itself be the performance characteristic (an example of this case is given in Embodiment 1, above), or the performance characteristic may determined in terms of this average (an example of this case is given in Embodiment 2 above). There are many possible choices of the particular function of the two point amplitude transmission matrix that we may choose to average.

One possible advantageous choices of the particular function of a two point amplitude transmission matrix is given as follows.
Since $$G_{j\alpha} = \int dk \int dk' \chi_T^j(k,\epsilon) S(r;k,\epsilon; r',k',\epsilon') \chi_R^\alpha(k',\epsilon') \quad (2c)$$

and $$I = \log_2 \det(1 + G^+ Q G/N) \quad (4b)$$

We have I as a function of the two point amplitude transmission matrix S and the direct average I information capacity (as discussed in embodiment 1 above) is itself an advantageous measure of performance.

Another possible advantageous choice is to calculate the average of G itself.

Another advantageous choice (discussed in embodiment 2 above) of a function of the two point amplitude transmission matrix S is given by $K_{ij\alpha\beta} = \overline{G_{i\alpha} G^*_{j\beta}}$ (the overbar denoting the average). Again, since G is a function of S, this quantity is indeed an an average of a function of S. From this quantity, using the methods disclosed in U.S. patent application Ser. No. 09/378,362 (Balents et al.), a suitable performance characteristic can be obtained.

The chosen average of a function of a two point amplitude transmission matrix may be calculated in many ways. Exemplary methods include solving: a Boltzmann diffusion model, a statistical Boltzmann model, or a diffusion equation model for a representation of the system's environment described in step 501 (an example of solving a diffusion equation is given in embodiment 2 discussed above). Other exemplary methods involve solving ray tracing equations for a model of the system's environment and then, averaging sets of ray tracing solutions between two points over phases of the solutions (an example of this is discussed in embodiment 1 discussed above). Several of these exemplary methods are discussed in Baranger et al, U.S. Pat. No. 6,119,009 "Method and apparatus for modeling the propagation of wireless signals in buildings".

In step 504, the average of a function of the two point amplitude transmission matrix is used to determine a performance characteristic. This performance characteristic may be an average information capacity, or an outage capacity. Other advantageous performance characteristics will be obvious to those skilled in the art. We note that the average of a function of the two point amplitude transmission matrix, may itself be the performance characteristic (as in embodiment 1 above). As another example (as in example 4 above) if $K_{ij\alpha\beta} = \overline{G_{i\alpha} G^*_{j\beta}}$ is the calculated average of a function of a two point amplitude transmission matrix, and if the average of G is zero, the expected capacity (a performance characteristic) may be calculated from this quantity using the method of U.S. patent application Ser. No. 09/378,362 (Balents et al.).

In step 505, we decide whether the performance is satisfactory. If the performance is not satisfactory, then changes to the system are proposed and steps 502–505 are iterated until a satisfactory performance is obtained. Alternatively, iteration may be performed to find an optimal performance without a particular satisfaction requirement. Finally, in step 506, the communication system is deployed and operated in accordance with the configuration described in step 502.

When the method of steps 501 through 506 is applied to a system, such as one of the examples 1–5 described previously, a method for modeling an information capacity of a multi-antenna wireless system is achieved This method of steps 501–506 improves and/or optimizes the information capacity of a MIMO system by modeling with transmitter and receiver arrays, each possibly with a small number of elements or a smaller transmitted power. It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method for configuring a wireless communication system that has a plurality of antennas, the method comprising:

solving an environmentally averaged transport equation to evaluate an average of a function of a two-point complex amplitude transmission matrix representative of the communication system; and calculating a set of quantities from the evaluated average of a function of a two-point complex amplitude transmission matrix; and wherein each quantity is representative of an information transfer rate between a pair of the antennas, the information transfer rate depending on relative orientations or positions of a plurality of elements of at least one of the antennas of the associated pair.

2. The method of claim 1, wherein the act of solving includes solving a diffusion equation for an environment of the system.

3. The method of claim 2, wherein at least one of the calculated quantities comprises an ensemble average of an information capacity over at least one random variable.

4. The method of claim 2, further comprising:

determining a configuration of the system that optimizes communication information transmission from one of the antennas to a portion of the antennas based on the calculated quantities.

5. The method of claim 2, further comprising:

determining one of an orientation, a position, a shape, and a transmission covariance of one of the antennas based on the calculated quantities.

6. The method of claim 1, wherein the act of solving includes solving a Boltzmann equation for an environment of the system.

7. The method of claim 6, wherein at least one of the calculated quantities comprises an ensemble average of an information capacity over at least one random variable.

8. The method of claim 6, further comprising:

determining a configuration of the system that optimizes communication information transmission from one of the antennas to a portion of the antennas based on the calculated quantities.

9. The method of claim 6, further comprising:

determining one of an orientation, a shape, and a transmission covariance of one of the antennas based on the calculated quantities.

10. The method of claim 1, wherein the act of solving includes determining a set of ray tracing solutions for an environment of the system and performing a phase average over the solutions.

11. The method of claim 10, wherein at least one of the calculated quantities comprises an ensemble average of an information capacity over at least one random variable.

12. The method of claim 10, further comprising:

determining a configuration of the system that optimizes communication information transmission from one of the antennas to a portion of the antennas based on the calculated quantities.

13. The method of claim 10, further comprising:

determining one of an orientation, a shape, and a transmission covariance of one of the antennas based on the calculated quantities.

14. A program storage medium encoding a computer executable program of instructions for a method of steps for configuring a wireless communication system that has a plurality of antennas, the steps comprising:

solving an environmentally averaged transport equation to evaluate an average of a function of a two-point complex amplitude transmission matrix representative of the communication system; and calculating a set of quantities from the evaluated average of a function of a two-point complex amplitude transmission matrix; and wherein each quantity is representative of an information transfer rate between a pair of the antennas, the information transfer rate depending on relative orientations or positions of a plurality of elements of at least one of the antennas of the associated pair.

15. The medium of claim 14, wherein the step for solving includes solving a diffusion equation for an environment of the system.

16. The medium of claim 14, wherein the step for solving includes solving a Boltzmann equation for an environment of the system.

17. The medium of claim 14, wherein step for solving includes determining a set of ray tracing solutions for an environment of the system and performing a phase average over the solutions.

18. The medium of claim 14, wherein at least one of the calculated quantities comprises an ensemble average of an information capacity over at least one random variable.

19. The medium of claim 14, wherein the steps further comprise:

determining a configuration of the system that optimizes communication information transmission from one of the antennas to a portion of the antennas based on the calculated quantities.

20. The medium of claim 14, wherein the steps further comprise:

determining one of an orientation, a shape, and a transmission covariance of one of the antennas based on the calculated quantities.

* * * * *